United States Patent [19]

Kumagai

[11] Patent Number: 5,059,274
[45] Date of Patent: Oct. 22, 1991

[54] TIRE FORMING APPARATUS INCLUDING UPPER AND LOWER CONVEYORS

[75] Inventor: Yuzo Kumagai, Tokyo, Japan

[73] Assignee: Bridgestone Corporation, Tokyo, Japan

[21] Appl. No.: 414,345

[22] Filed: Sep. 29, 1989

Related U.S. Application Data

[62] Division of Ser. No. 100,658, Sep. 24, 1987, Pat. No. 4,875,959.

[30] Foreign Application Priority Data

Sep. 24, 1986 [JP] Japan .................................. 61-225336

[51] Int. Cl.$^5$ ............................................. B29D 30/00
[52] U.S. Cl. ............................ 156/406.4; 198/418.3; 198/418.4
[58] Field of Search .................. 156/405.1, 406, 406.4, 156/406.6, 123, 130, 133, 563; 198/418.3, 418.4, 448; 271/9, 225, 69, 184

[56] References Cited

U.S. PATENT DOCUMENTS 3,709,350 1/1973 Flesselles et al. .................. 198/448
3,898,116 8/1975 Katagiri et al. .................. 156/406 X Primary Examiner—Geoffrey L. Knable
Attorney, Agent, or Firm—Sughrue, Mion, Zinn, Macpeak & Seas

[57] ABSTRACT

In a tire forming method or apparatus, a plurality of belt-shaped tire forming members are cut to predetermined lengths and piled one on another with their ends shifted in a longitudinal direction to form a member assembly, and the latter is wound on a tire forming drum so that the tire forming members are wound simultaneously and the ends of each of the tire forming members are joined together with high accuracy, whereby the tire forming member winding work can be achieved with high efficiency and with ease.

7 Claims, 2 Drawing Sheets

TIRE FORMING APPARATUS INCLUDING UPPER AND LOWER CONVEYORS

This is a division of application Ser. No. 07/100,658 filed Sept. 24, 1987, now U.S. Pat. No. 4,875,954.

BACKGROUND OF THE INVENTION

This invention relates to a tire forming method and to an apparatus for practicing the method.

In general, in a tire forming operation, a carcass layer is stuck on a tire forming drum, and then chafing member for reinforcing the beads are bonded to the carcass layer. In this operation, heretofore the following method is employed: The operator pulls a belt-shaped members made up of a plurality of chafing members out of the reel which are laid one on another, and bonds it to the carcass layer while winding it on the drum by one turn. Under this condition, the chafing members are cut along the reinforcing cords with a cutter. Thereafter, the ends of each of the chafing members are joined together.

However, the method described above is disadvantageous in the following points: Since the belt-shaped member supplied from the reel is made up of a plurality of chafing members piled one on another as was described above, an inner chafing member cannot be cut or joined without peeling the outer chafing member or members off the inner chafing member. This will make the tire forming operation intricate, and accordingly lower the work efficiency. Furthermore, the peeling work, being troublesome, is burdensome on the operator.

SUMMARY OF THE INVENTION

Accordingly, an object of this invention is to provide a tire forming method in which the above-described difficulties accompanying a conventional tire forming method, and an apparatus for practicing the method.

The foregoing object and other objects of the invention have been achieved by the provision of a tire forming method in which, according to the invention, a plurality of kinds of tire forming members are cut to predetermined lengths while being conveyed, the tire forming members thus cut are piled one on another with the ends thereof shifted longitudinally, to form a member assembly, and the member assembly thus formed is wound on a tire forming drum, while being turned inside out, in accordance with another aspect of this invention a tire forming apparatus comprises; conveying means having at least two conveyors laid one over another in such a manner that the downstream end portion of the upper conveyor forms an acute angle with the lower conveyor; and cutting means for cutting to predetermined lengths different kinds of tire forming members which are conveyed respectively by the conveyors of the conveying means, in which, according to the invention, the lower conveyor is bent at the intersection of the prolongation of the downstream end portion of the upper conveyor and the lower conveyor in such a manner that downstream side of the intersection is flush with the conveying surface of the downstream end portion of the upper conveyor, an extension conveyor is disposed between the downstream end of the upper conveyor and the bend point of the lower conveyor in such a manner that the conveying surface of the extension conveyor is flush with those of the upper and lower conveyors, and drive means is provided to forcibly drive the extension conveyor.

In the invention, a plurality of kinds of tire forming members are cut to predetermined lengths while being conveyed before they are wound on the tire forming drum. Therefore, in cutting any one of the tire forming members, no additional operation such as the peeling of the other tire forming member or members is required. This will improve the work efficiency and lessen the burden on the operator. The tire forming members thus cut are piled one on another with their ends shifted longitudinally thereof, to form the member assembly. Therefore, a plurality of tire forming members can be wound on the tire forming drum simultaneously by supplying the member assembly to the latter as it is. In this operation, the member assembly is wound on the tire forming drum while being turned inside out. This will make it possible to join the ends of each of the tire forming members without interference with the others.

Furthermore, in the invention, the lower conveyor is bent so that the conveying surface of the lower conveyor is flush with that of the upper conveyor, and a forcibly driven extension conveyor is disposed between these conveying surface. Therefore, the tire forming members are never deformed by the oblique reinforcing cords contained therein, and are piled one on another being conveyed to the lower conveyor from the upper conveyor. Accordingly, the tire forming members are positioned relative to one another with high accuracy. Thus, the tire produced according to the invention is high in performance.

The nature, principle and utility of the invention will become more apparent from the following detailed description when read in conjunction with the accompanying drawings.

DETAILED DESCRIPTION OF THE INVENTION

One preferred embodiment of this invention will be described with reference to the accompanying drawings.

Figure 1:
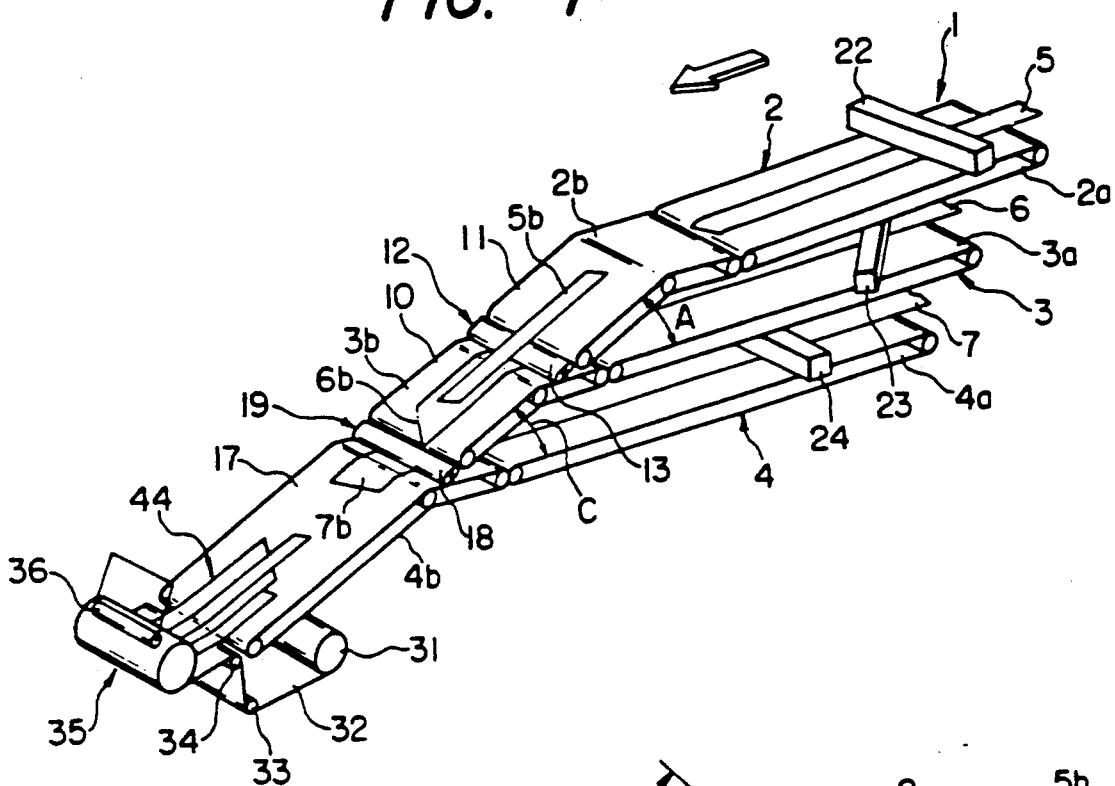
FIGS. 1 and 2 are a perspective view and a front view outlining the arrangement of a tire forming apparatus for practicing a tire forming method according to this invention, respectively.
Figure 2:
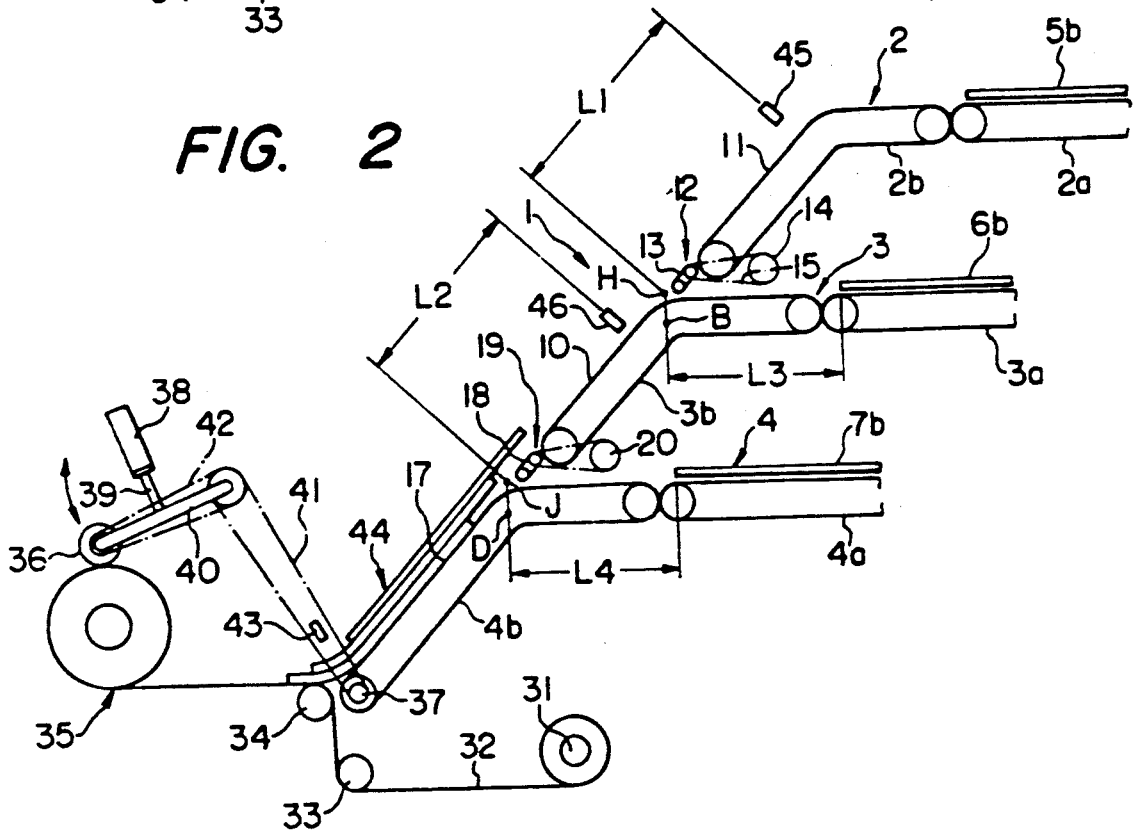

A tire forming apparatus according to the invention, as shown in FIGS. 1 and 2, comprises conveying means 1 including three conveyor units 2, 3 and 4 which are laid one over another the conveyor units 2, 3 and 4 have horizontal conveyors 2a, 3a and 4a on the upstream side and sloped conveyors 2b, 3b and 4b on the downstream side, respectively. The horizontal conveyors 2a, 3a and 4a are intermittently run forwardly by means of an electric motor (not shown), while the sloped conveyors 2b, 3b and 4b are continuously run forwardly at equal speed by means of an electric motor (not shown). These conveyors 2, 3 and 4 are adapted to convey different kinds of tire forming members, namely, chafing members.

The downstream end portion of the sloped conveyor 2b is sloped downwardly, thus forming an acute angle A with the horizontal portion of the sloped conveyor 3b which is located just under the sloped conveyor 2b. The sloped conveyor 3b is bent downwardly at the intersection B of the sloped conveyor 3b and the prolongation of the downstream end portion of the sloped conveyor 2b; that is, similarly as in the sloped conveyor 2b, the sloped conveyor 3b has a downstream end portion bent downwardly at the intersection B, and the downstream end portion forms an acute angle C with the horizontal portion of the sloped conveyor 4b located just under the sloped conveyor 3b. The acute angle C is equal to the acute angle A. The conveying surface 10 of the downstream end portion of the sloped conveyor 3b is flush with the conveying surface 11 of the downstream end portion of the sloped conveyor 2b. A belt type extension conveyor serving as an extension of the sloped conveyor 2b is disposed between the downstream end portion of the sloped conveyor 2b and the bend of the sloped conveyor 3b in such a manner that the conveying surface 13 of the extension conveyor 12 is flush with the conveying surfaces 10 and 11 of the sloped conveyors 2b and 3b. The extension conveyor 12 is flush through a chain 15 to drive means, namely, an electric motor 14, so that the extension conveyor 12 is driven by the motor 14 in the same direction and at the same speed as the sloped conveyors 2b and 3b.

Similarly as in the sloped conveyor 3b, the sloped conveyor 4b is bent downwardly at the intersection D of the prolongation of the downstream end portion of the sloped conveyor 3b and the sloped conveyor 4b; that is, the conveyor 4b has a downstream end portion bent downwardly at the intersection D. The conveying surface 17 of the downstream end portion of the sloped conveyor 4b is flush with the conveying surface 10 of the downstream end portion of the sloped conveyor 3b. Similarly, a belt type extension conveyor 19 serving as an elongation of the sloped conveyor 3b is disposed between the downstream end portion of the sloped conveyor 3b and the bend point of the sloped conveyor 4b in such a manner that its conveying surface 18 is flush with the conveying surfaces 10 and 17. The extension conveyor 19 is driven through a chain 21 by means of an electric motor 20 in the same direction and at the same speed as the sloped conveyors 3b and 4b. As illustrated in FIGS. 1 and 2, flush conveying surfaces are aligned and substantially coplanar.

Further in FIG. 1, reference numeral 22, 23 and 24 designate cutting means arranged above the horizontal conveyors 2a, 3a and 4a, respectively. The cutting means 22, 23 and 24 operate to cut the chafing members 5, 6 and 7 along the reinforcing cords and at angles with respect to the widthwise direction thereof The cutting direction of the cutting means 22 for the chafing member 5 is opposite to that of the cutting means 23 for the chafing member 6 which is in turn opposite to that of the cutting means 24 for the chafing member 7. A liner 32 is wound on a reel 31. The lines 32 rewound from the reel 31 is bent zigzag with idlers 33 and 34 immediately before the downstream end of the sloped conveyor 4b. Winding means 35 is provided to wind on it the liner 32 together with the cut chafing members 5b, 6b and 7b unloaded from the sloped conveyor 4b.

The winding means 35, as shown in FIG. 2, is provided with a drive roller 36 which is brought into contact with the liner 32 wound to drive the winding means. The drive roller 36 is rotatably supported by an arm 40 which is coupled to the end of the piston rod 39 of a cylinder 38. The arm 40 is therefore swung about the base end by the operation of the cylinder 38 as indicated by the arrow. The drive force of the sloped conveyor 4b is transmitted through a clutch 37 and chains 41 and 42 to the drive roller 36 to rotate the latter 36. A detector 43 is provided just above the idler 34. The detector 43 operates to detect the front and rear ends of a member assembly 44 which is formed by piling the cut chafing members 5b, 6b and 7b one on another, thereby to control the operation of the aforementioned clutch 37. A detector 45 is disposed just above the middle of the sloped conveyor 2b. More specifically, the detector 45 is located at a distance L1 from the point H where the cut chafing members 5b and 6b meet. Similarly, a detector 46 is disposed just above the middle of the sloped conveyor 3b. More specifically, the detector 46 is located at a distance L2 from the point J where the cut chafing members 6b and 7b. Upon detection of the front ends of the members 5b and 6b, the detectors 45 and 46 activate the motors for driving the horizontal conveyors 3a and 4a, respectively.

Figure 3:
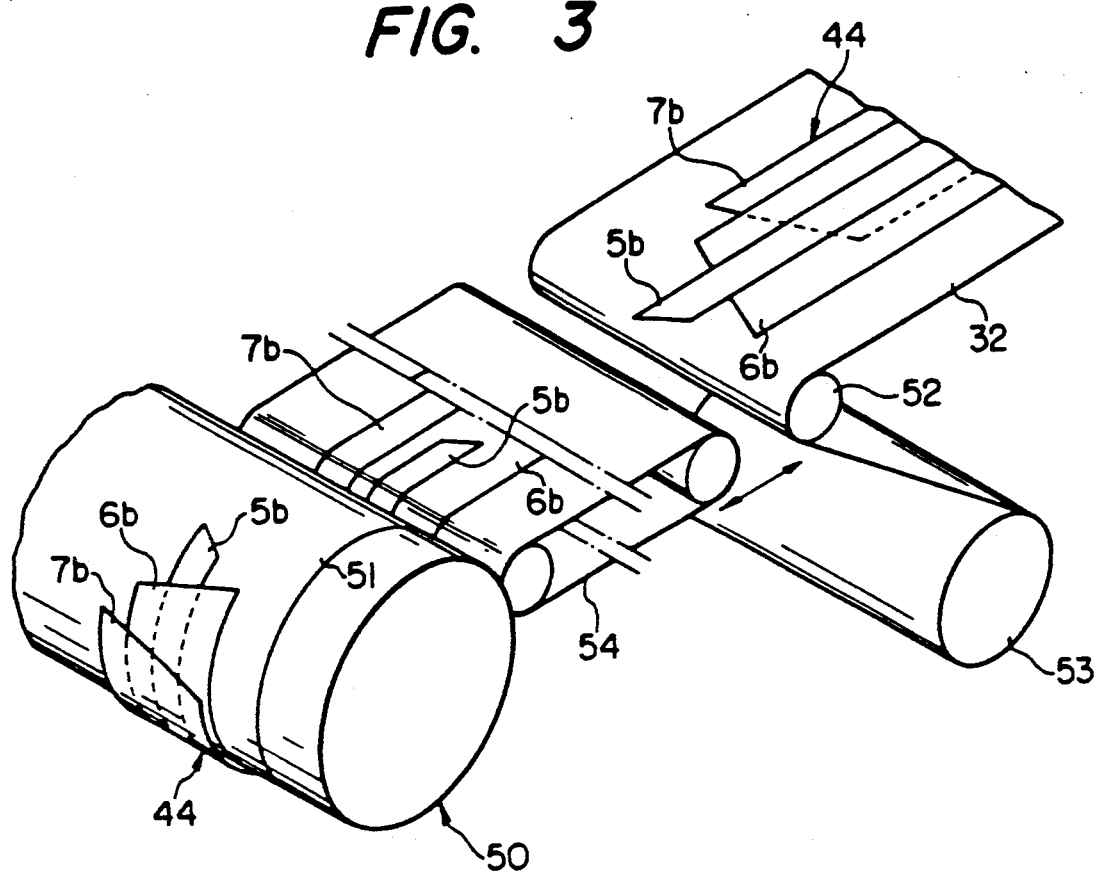
FIG. 3 is a perspective view showing a member assembly wound on a tire forming drum.

FIG. 3 shows the member assembly 44 wound on a tire forming drum 50. Another tire forming member, for instance a carcass layer 51, is stuck on the tire forming drum 50 in advance. A guide roller 52 is disposed in front of the tire forming drum. The liner 32 rewound from a winder (not shown) on which the liner 32 and the member assembly 44 have been wound is laid over the guide roller 52, so that the direction of advancement of the liner 32 is changed. The liner 32 thus treated is wound on a winding roller 53. As the direction of advancement of the liner 32 is changed as was described above, the member assembly 44 is separated from the liner 32 and loaded on an applier 54 which is disposed between the tire forming drum 50 and the guide roller 52 in such a manner that the applier 54 is movable towards and away from the tire forming drum 50. As the applier 54 runs, the member assembly 44 loaded thereon is conveyed towards the tire forming drum 50 and transferred onto the drum 50, and finally wound on the carcass layer 51 as required.

The operation of the tire forming apparatus thus constructed will be described.

First, the belt-shaped chafing members 5, 6 and 7 are supplied from reels (not shown) to the horizontal conveyors 2a, 3a and 4a, respectively. Under this condition, the front end portions of these members 5, 6 and 7 are cut with the cutting means 22, 23 and 24 substantially in the widthwise directions, respectively. In this operation, the members 5, 6 and 7 are cut along their reinforcing cords. Since the cords of the members 5, 6 and 7 are opposite in direction to one another, the cutting directions thereof are also opposite to one another as shown in FIG. 1. The horizontal conveyor 2a, 3a and 4a are driven forwardly or in the direction of the arrow in FIG. 1 to convey the members 5, 6 and 7 for a predetermined distance, and the members 5, 6 and 7 thus conveyed are cut with the cutting means 22, 23 and 24 again in the same manner, respectively. As a result, the cut chafing members 5b, 6b and 7b which have a predetermined length corresponding to the circumference of the tire forming drum 50 are obtained. Under this condition, the horizontal conveyors 2a, 3a and 4a are driven forwardly to convey the cut chafing members 5b, 6b and 7b until the front ends of these members 5b, 6b and 7 b reach the downstream ends of the horizontal conveyors 2a, 3a and 4a, respectively, as shown in FIG. 2. When the members 5b, 6b and 7b has reached the downstream ends of the horizontal conveyors 2a, 3a and 4a, the distance between the member 6b and the aforementioned meeting point H is L3, and the distance between the member 7b and the meeting point J is L4.

Figure 4:
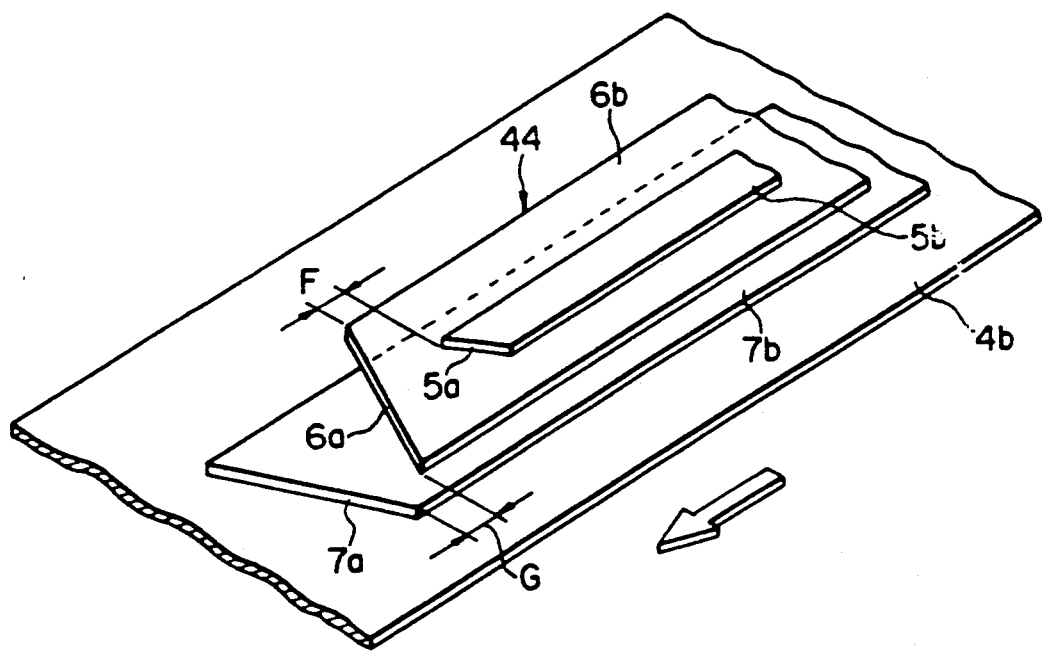
FIG. 4 is a perspective view showing a part of the member assembly on a conveyor.

Thereafter, the horizontal conveyor 2a is driven so that the cut chafing member 5b is transferred from the horizontal conveyor 2a to the sloped conveyor 2b. Upon detection of the front end of the member 5b by the detector 45, the horizontal conveyor 3a is driven to transfer the cut chafing member 6b to the sloped conveyor 3b from the horizontal conveyor 3a. In this operation, since the sloped conveyors 2b and 3b and the extension conveyor 12 are run in the same direction and at the same speed, the members 5b and 6b meet each other at the meeting point H, so that the front end portion of the member 5b is laid on the front end portion of the member 6b. As a result, as shown in FIGS. 1 and 4, a distance F (=L1−L3) for which the member 6b goes ahead of the member 5b is provided between the front end face 6a of the member 6b and the front end face 5a of the member 5b. At the same time, the extension conveyor 12 is driven. As was described before, the conveying surfaces 10, 11 and 12 are flush with one another. Therefore, when the cut chafing member 5b is transferred from the sloped conveyor 2b to the sloped conveyor 3b, the difficulty that the front end face 5a collides obliquely with the conveying surface 10 of the sloped conveyor 3b or contacts stationary guides or other conveyors different in speed will not be involved; that is, the member 5b is smoothly transferred from the sloped conveyor 2b to the sloped conveyor 3b. Accordingly, the position of the member 5b relative to that of the member 6b in the widthwise direction is maintained correct; that is, the members 5b and 6b are positioned correctly.

The members 5b and 6b thus piled is forwarded by the sloped conveyor 3b. Upon detection of the front ends of the members 5b and 6b by the detector 46, the horizontal conveyor 4a is driven, so that the cut chafing member 7b is transferred to the sloped conveyor 4b. As a result, the members 5b and 6b meet the member 7b at the meeting point J, and the front end portions of the members 5b and 6b are laid on the front end portion of the member 7b, being accurately positioned. In this operation, as shown in FIG. 4, a distance G (=L2−L4) for which the member 7b goes ahead of the member 6b is provided between the front end face 6a of the member 6b and the front end face 7a of the member 7b.

On the other hand, as the horizontal conveyors 2a, 3a and 4a are driven, the chafing members 5, 6 and 7 are laid on the horizontal conveyors 2a, 3a and 4a with the front ends thereof at the downstream ends of the conveyors 2a, 3a and 4a, respectively. Then, these conveyors 2a, 3a and 4a are driven backwardly for a predetermined distance, and the chafing members 5, 6 and 7 are cut with the cutting members 22, 23 and 24 to form the cut chafing members 5b, 6b and 7b having the predetermined length.

As was described above, the members 5b, 6b and 7b being piled one on another form the member assembly 44. When the member assembly 44 comes near the downstream end of the sloped conveyor 4b, the detector 43 detects the front end of the member assembly 44 to connect the clutch 37 thereby to rotate the drive roller 36. As a result, the line 32 is pulled out of the reel 31 so as to be wound on the winding means 35. In this operation, the member assembly 44 is transferred from the downstream end of the sloped conveyor 4b onto the liner being wound; that is, the member assembly 44 together with the liner is wound. A short time after the detector 43 detects the rear end of the member assembly 44, the clutch 37 is disconnected to stop the drive roller 36, so that the winding of the liner 32 is suspended.

As is apparent from the above description, in the tire forming apparatus of the invention, the detector 43 detects the front and rear ends of the member assembly 44 to control the rotation of the winding means 35, so that the member assembly accommodating percentage is increased with a minimum gap between the member assemblies loaded on the liner 32.

The roll formed by winding the member assemblies together with the liner 32 is stored temporarily, and then set on a rewinding unit installed just before the tire forming drum 50. The member assembly 44 rewound together with the liner 32 from the rewinding unit is separated from the liner 32 by means of the guide roller 52 and transferred onto the applier 54, while the liner 32 is wound on the winding roller 53. In this case, as opposed to the case of winding the member assembly, the cut chafing member 5b is followed by the cut chafing members 6b and 7b in the stated order.

The member assembly 44 on the applier 54 approaches the tire forming drum 50 as the applier runs and moves. When the applier 54 abuts against the tire forming drum 50, the tire forming drum 50 is rotated, and the applier 54 is driven, so that the member assembly 44 is transferred from the applier 54 onto the carcass layer stuck on the tire forming drum and wound on it. In this operation, the members 5b, 6b and 7b are laid on the tire forming drum 50 in the stated order. Therefore, when the member assembly 44 is wound on the tire forming drum 50, the rear ends of the members 6b and 7b will not be piled on the rear ends of the members 5b and 6b, respectively. Accordingly, by only one revolution of the tire forming drum, the cut chafing members 5b, 6b and 7b in the form of multiple layers can be wound on the tire forming drum 50 and the ends of the members 5b, 6b and 7b in the form of multiple layers can be wound on the tire forming drum 50 and the ends of the members 5b, 6b and 7b can be joined, respectively.

Thereafter, beads are arranged on the member assembly 44, and other tire forming members such as a belt layer and a tread rubber layer are further arranged. Thus, a green tire has been formed.

In the above-described embodiment, the member assembly is wound together with the liner 32 and stored temporarily, and is then supplied to the tire forming drum 50. However, the member assembly formed by laying the cut chafing members one on another may be directly supplied to the tire forming drum 50 so that it is wound on the drum 50.

In the above-described embodiment, the member assembly is formed with three kinds of cut chafing members 5b, 6b and 7b. However, in the invention, the member assembly maybe made of two kinds or more than three kinds of cut chafing members.

Furthermore, in the invention, the chafing members may be replaced by other members. The extension conveyors may be roller conveyors comprising a plurality of rollers. In addition, the extension conveyors 12 and 19 may be driven by the drive means provided for the conveyors 2 and 3.

As is apparent from the above description, according to the invention, the winding work can be achieved with high efficiency and the burden on the operator can be lessened.

What is claimed is:

1. A tire forming apparatus comprising: a tire forming drum, conveying means having at least two endless conveyors laid one over another in such a manner that the downstream end portion of the upper conveyor forms an acute angle with a substantially horizontal run of a portion of a lower conveyor; and cutting means for cutting to predetermined lengths different kinds of tire forming members which are conveyed respectively by said conveyors of said conveying means and supplied to said tire forming drum, in which:

said lower conveyor is bent at the intersection of an extension line of the downstream end portion of said upper conveyor and said lower conveyor in such a manner that a conveying surface of said lower conveyor which is on the downstream side of said intersection is aligned and substantially coplanar with the conveying surface of the downstream end portion of said upper conveyor, an extension conveyor is disposed between the downstream end of said upper conveyor and the bend point of said lower conveyor in such a manner that a conveying surface of said extension conveyor is aligned and substantially coplanar with those of said upper and lower conveyors, and drive means is provided to forcibly drive said extension conveyor.

2. The tire forming apparatus of claim 1 further comprising a third conveyor positioned under said lower conveyor, said third conveyor bent downward to form a conveying surface which is aligned and substantially coplanar with said upper conveyor downstream end portion, said conveying surface of said extension conveyor and said conveying surface of said lower conveyor.

3. The tire forming apparatus of claim 2 further comprising a second extension conveyor, said second extension conveyor positioned between said third conveyor and said lower conveyor and having a conveying surface which is aligned and substantially coplanar with those of said lower and third conveyors.

4. The tire forming apparatus of claim 1 further comprising a winding roller for winding said tire forming members after they have been stacked by said conveyors and a means for winding a liner on said winding roller together with said tire forming members for temporary storage of said tire forming members before they are supplied to said tire forming drum.

5. The tire forming apparatus of claim 4 further comprising means to rotate said winding roller.

6. The tire forming apparatus of claim 5 wherein said means to rotate comprises a drive roller rotatably supported by a movable arm, a cylinder to selectively urge said drive roller into contact with said winding roller and power transmission means to rotate said drive roller.

7. The drive forming apparatus of claim 4 further comprising an applying conveyor positioned between said tire forming drum and a liner conveying said stacked tire members, said applying conveyor movable to receive said stacked tire members from said liner and to apply said stacked tire members to said tire forming drum.

* * * * *